(12) United States Patent
Silverstein et al.

(10) Patent No.: US 12,437,484 B2
(45) Date of Patent: Oct. 7, 2025

(54) DYNAMIC AUGMENTED REALITY AND SCREEN-BASED REBINDING BASED ON DETECTED BEHAVIOR

(71) Applicant: INTERNATIONAL BUSINESS MACHINES CORPORATION, Armonk, NY (US)

(72) Inventors: Zachary A. Silverstein, Georgetown, TX (US); Logan Bailey, Atlanta, GA (US); Dylan Zucker, New York, NY (US); Thomas Jefferson Sandridge, Tampa, FL (US)

(73) Assignee: International Business Machines Corporation, Armonk, NY (US)

( * ) Notice: Subject to any disclaimer, the term of this patent is extended or adjusted under 35 U.S.C. 154(b) by 347 days.

(21) Appl. No.: 18/186,478

(22) Filed: Mar. 20, 2023

(65) Prior Publication Data

US 2024/0320924 A1  Sep. 26, 2024

(51) Int. Cl.
*G06T 19/00* (2011.01)

(52) U.S. Cl.
CPC .................. *G06T 19/006* (2013.01)

(58) Field of Classification Search
CPC .............. G06T 19/006; G06F 3/011
See application file for complete search history.

(56) References Cited

U.S. PATENT DOCUMENTS

| 10,115,233 B2 | 10/2018 | Miller |
| 2007/0180407 A1 | 8/2007 | Vahtola |
| 2011/0028194 A1 | 2/2011 | Tang |

(Continued)

FOREIGN PATENT DOCUMENTS

GB 2579659 A 7/2020

OTHER PUBLICATIONS

Businesswire, "The Worldwide Augmented Reality Gaming Industry is Expected to Reach $38 Billion by 2027—ResearchAndMarkets.com," ResearchAndMarkets.com [online], May 31, 2022 [accessed on Feb. 28, 2023], 3 pages, Retrieved from the Internet: <URL: https://www.businesswire.com/news/home/20220531005453/en/The-Worldwide-Augmented-Reality-Gaming-Industry-is-Expected-to-Reach-38-Billion-by-2027---ResearchAndMarkets.com>.

(Continued)

*Primary Examiner* — Peter Hoang
(74) *Attorney, Agent, or Firm* — Robert D. Bean

(57) ABSTRACT

According to one embodiment, a method, computer system, and computer program product for mixed-reality peripheral interfacing is provided. The present invention may include recording, with a camera, video footage of a peripheral held by a user participating in a mixed-reality environment; extracting, by a processor, peripheral data from the video footage; extracting interface data from the video footage; extracting input data entered into the peripheral by the user; responsive to determining that one or more keybindings do not match the peripheral, rebinding one or more keybindings of the peripheral based on the peripheral data; displaying a virtual representation of the peripheral to the user within the mixed-reality environment based on the peripheral data; and displaying a virtual representation of the user interacting with the virtual representation of the peripheral within the mixed-reality environment based on the interface data and the input data.

17 Claims, 2 Drawing Sheets

(56) References Cited

U.S. PATENT DOCUMENTS

| | | |
|---|---|---|
| 2015/0058776 A1 | 2/2015 | Liu |
| 2015/0302656 A1* | 10/2015 | Miller .................... G06T 11/60 |
| | | 345/633 |

OTHER PUBLICATIONS

Disclosed Anonymously, "Augmented Reality Interface for Visualizing and Interacting with IoT Devices," IP.com, Sep. 11, 2018, 22 pages, IP.com No. IPCOM000255233D, Retrieved from the Internet: <URL: https://priorart.ip.com/IPCOM/000255233>.

Disclsoed Anonymously, "System and Method for Capturing and Computing Video Game Relevant Data, to Apply Autonomous Play and Predicting Optimized Strategic Actions," IP.com, Jan. 18, 2022, 5 pages, IP.com No. IPCOM000268268D, Retrieved from the Internet: <URL: https://priorart.ip.com/IPCOM/000268268>.

IBM, "Game server hosting on IBM Cloud," IBM [online], [accessed on Feb. 28, 2023], 8 pages, Retrieved from the Internet: <URL: https://www.ibm.com/cloud/game-hosting>.

Tkainrad, "An Interactive Virtual Keyboard to Visualize any Collection of Shortcuts," tkainrad.dev [blog], Feb. 17, 2021 [Accessed on Feb. 28, 2023], 7 pages, Retrieved from the Internet: <URL: https://tkainrad.dev/posts/visualize-collections-of-keyboard-shortcuts/>.

* cited by examiner

DYNAMIC AUGMENTED REALITY AND SCREEN-BASED REBINDING BASED ON DETECTED BEHAVIOR

BACKGROUND

The present invention relates, generally, to the field of computing, and more particularly to human-computer interaction.

The field of human-computer interaction concerned with the hardware and software elements by which a human being interacts with a machine, such as a computer. The goal of such interaction is to enable effective operation and control of the machine by a human user, while the machine simultaneously provides information back to the user to facilitate the decision-making processes of the user. Generally, the goal of the field of human-computer interaction is to produce and refine the interface between the human user and the computer to improve the ease, efficiency, user-friendliness, and enjoyability with which a user interacts with the computer, while simultaneously enabling the computer to operate in a way which produces the desired result in response to user inputs; in practical terms, this typically entails minimizing the inputs that a human user must provide to achieve the desired output, and minimizing undesired outputs from the machine to the human user. Human-computer interaction is a more important field than ever as computers become ever more widespread in use, and its precepts can be applied in a wide variety of computing contexts including computerized vehicles and appliances, internet browsing, gaming, mixed-reality, and more.

Keybinding is a concept associated with human-computer interaction comprising the practice of mapping one or more user inputs, often corresponding with an individual physical button, key, or other interface element, to one or more actions by a computer, such as invoking a software program or performing a preprogrammed action. Such a mapped input-action pair is referred to as a "hotkey." A keybinding may comprise a number of hotkeys and may refer to general suite of hotkeys associated with a given software program, game, operating system, user profile, et cetera. Hotkeys enable a user to execute operations that would otherwise be accessible only through a menu, a pointing device, different levels of a user interface, or via a command-line interface. Hotkeys are generally used to expedite common operations by reducing input sequences to a few keystrokes, hence the term "shortcut." To differentiate from ordinary input, most hotkeys require the user to press and hold several keys simultaneously, or a sequence of keys one after the other. Unmodified key presses are sometimes accepted when the interface element is not used for general input, for example where the action is mapped to a function key on a keyboard which performs no action by default, but which is dedicated for use in shortcuts and may only require a single keypress. In fast-paced computing contexts such as gaming, programming, mixed-reality, et cetera, keybinding and human-computer interfacing in general offer critical boosts to the ease and efficiency with which a user translates their inputs into computer action.

SUMMARY

According to one embodiment, a method, computer system, and computer program product for mixed-reality peripheral interfacing is provided. The present invention may include recording, with a camera, video footage of a peripheral held by a user participating in a mixed-reality environment; extracting, by a processor, peripheral data from the video footage; extracting interface data from the video footage; extracting input data entered into the peripheral by the user; responsive to determining that one or more keybindings do not match the peripheral, rebinding one or more keybindings of the peripheral based on the peripheral data; displaying a virtual representation of the peripheral to the user within the mixed-reality environment based on the peripheral data; and displaying a virtual representation of the user interacting with the virtual representation of the peripheral within the mixed-reality environment based on the interface data and the input data.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
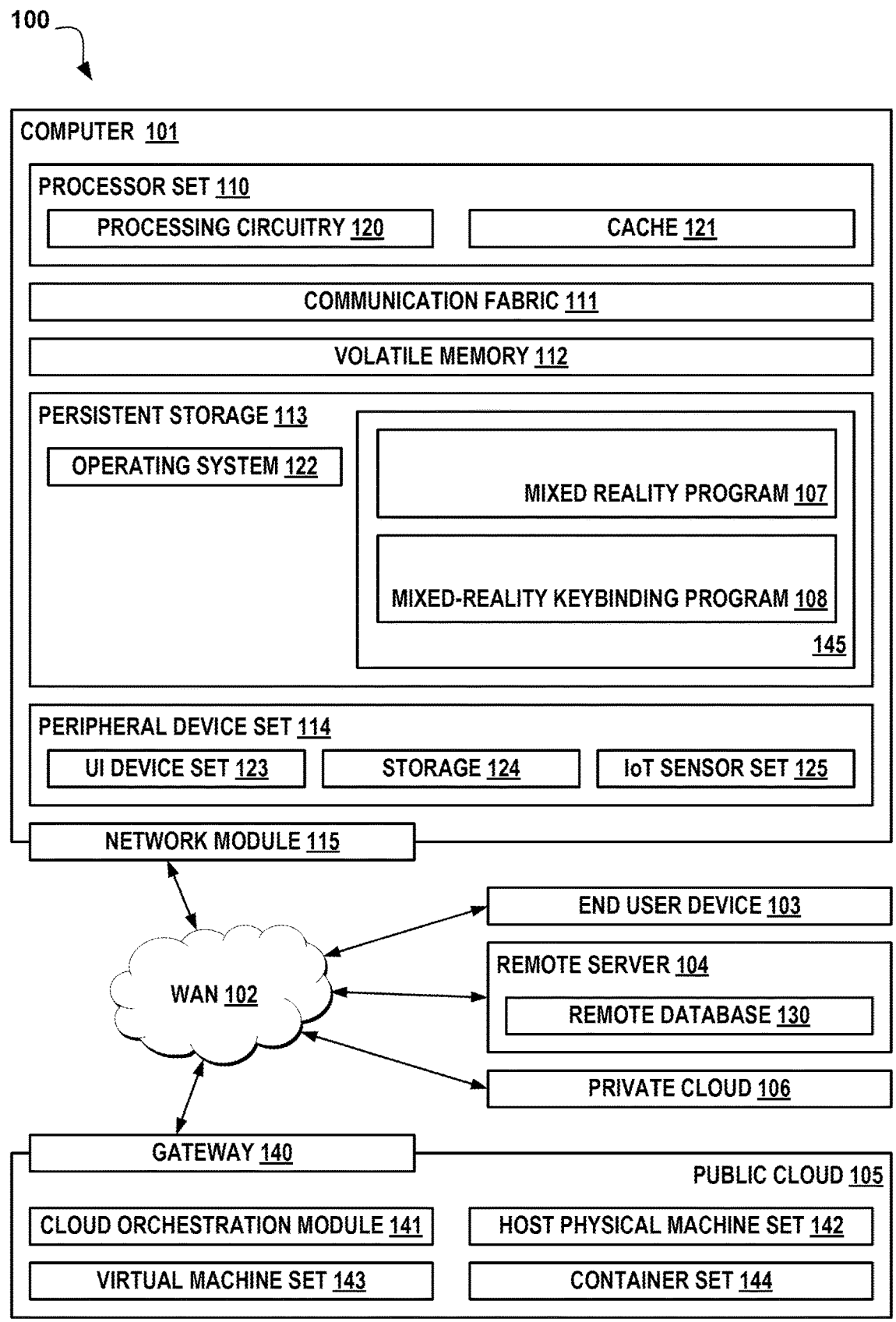
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to human-computer interaction. The following described exemplary embodiments provide a system, method, and program product to, among other things, visually identify a peripheral and a user interaction with the peripheral, change keybindings for the peripheral, and graphically represent to the user both the peripheral and the user interaction with the peripheral.

As previously described, keybinding is the practice of mapping one or more user inputs, often corresponding with an individual physical button, key, or other interface element, to one or more actions by a computer, such as invoking a software program or performing a preprogrammed action. In the context of gaming, all in-game actions, from moving a character to interacting with the game world to issuing commands to units, may be mapped to different keys or other interface elements, and may further be customizable, such that a user may change the individual mappings to the user's preference, and bind program functions to a different set of keystrokes instead of or in addition to the default. This is a useful feature in that oftentimes the default keybinding is insufficient for a given user for a variety of reasons; for example, the default keybinding may not take into account the particular hardware setup and interface options of a given user, may be poorly designed such that, for example, keys tied to important actions are difficult to reach, may be unintuitive to a user because, for example, the user is acclimated and has developed muscle memory for a different keybinding, et cetera. Furthermore, in this era of streaming and constant digital connection, users may be playing with or watching friends, teammates, and internet personalities and may wish to play as they do and import their keybindings, because other players may have developed more efficient keybindings than the default, may possess similar interface options or may have developed similar muscle memory to the user. However, short of asking another player for their keybindings and manually changing each hotkey, this is largely impossible.

A context that poses both challenges and opportunities with respect to human-computer interaction, and keybinding in particular, is that of mixed reality. Mixed reality is a format of media concerned with merging real and virtual worlds such that physical and digital objects co-exist and interact in real time. Mixed reality does not exclusively take place in either the physical or virtual worlds but is a hybrid of reality and virtual reality; as such, mixed reality describes everything in the reality-virtuality continuum except for the two extremes, namely purely physical environments and purely virtual environments. Accordingly, mixed reality includes augmented virtuality (AV), augmented reality (AR) and virtual reality (VR). Mixed-reality systems use software to generate images, sounds, haptic feedback, and other sensations to augment a real-world environment. While the creation of this augmented environment can be achieved with mobile devices such as cell phones or tablets, more specialized equipment is also used, typically in the form of glasses or headsets where computer generated elements are overlaid onto a view of the real world by being projected or mapped onto a lens in front of a user's eyes. With the help of computer augmentation, information about the surrounding world of the user, as well as other digital elements overlaid onto the world, become interactive and digitally manipulable.

In addition to mixed-reality devices comprising displays or lenses capable of projecting a mixed-reality environment to a user, a mixed-reality system may further comprise traditional video game controllers, computer mice, keyboards, specialized mixed-reality controllers equipped with motion tracking, or any other of a sizeable array of various peripherals. These may come with and/or be designed to interoperate with a mixed-reality headset or may be less expensive generic versions of a name-brand device, may be devices that were never specifically designed for mixed reality applications, et cetera. As a result, a given mixed-reality system may be incapable of recognizing a particular peripheral and may simply assign genericized keybindings to the peripheral that may have been meant for a different peripheral, resulting in mismatched keybindings which can make a user's interaction with the mixed-reality environment awkward, difficult, and frustrating.

As such, it may be advantageous to, among other things, implement a system that utilizes the cameras available to mixed-reality systems to identify peripherals and/or input means of peripherals, tailor keybindings to the identified peripherals and/or identified input means, and dynamically generate a graphical representation of the identified peripheral and/or identified input means within the visual field of the user. It may further be advantageous to record the real-world actions of the user as the user interacts with a peripheral, match those real-world actions with recorded inputs from the device, and utilize the recorded action-input pairs to animate an avatar and/or generated graphical representation of the identified peripheral and/or identified input means to demonstrate the physical interactions between a user and the peripheral to accomplish a particular input. Therefore, the present embodiment has the capacity to improve the technical field of human-computer interaction by automatically rebinding keys to better match the peripheral being used and the preferences of the user, provide educational visual illustrations of how to interact with the peripheral to perform various actions even where peripheral data is unavailable for a given peripheral, thereby improving the ease and facility with which a user interacts with a mixed reality system, improving user immersion and experience.

According to one embodiment, the invention is a system and method of utilizing a camera to identify a plurality of peripheral device data associated with a peripheral device, record user interaction with the peripheral device, customize one or more keybindings for the peripheral device based on the peripheral device data, and display a graphical representation of the peripheral device to the user which visualizes the user interactions.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The following described exemplary embodiments provide a system, method, and program product to visually identify a peripheral and a user interaction with the peripheral, change keybindings for the peripheral, and graphically represent to the user both the peripheral and the user interaction with the peripheral.

Referring now to FIG. 1, computing environment 100 contains an example of an environment for the execution of at least some of the computer code involved in performing the inventive methods, such as code block 145, which may comprise mixed reality program 107 and mixed-reality keybinding program 108. In addition to code block 145, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and code block 145, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in code block 145 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface type operating systems that employ a kernel. The code included in code block 145 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

According to the present embodiment, the mixed reality program 107 may be a program capable of creating and maintaining a mixed-reality environment and enabling individuals to connect to and interact with the mixed-reality environment and/or each other. In some embodiments, individuals may interact within the mixed-reality environment through the use of avatars, which may be three-dimensional virtual characters that represent an individual. The individual to which the avatar corresponds may be bound to the single perspective and location of the avatar but may control the movements and actions of the avatar to navigate and interact with the mixed-reality environment and participant avatars, objects, or other virtual elements within the mixed-reality environment. The individual to which the avatar corresponds may additionally control the appearance, dimensions, and other characteristics of the avatar. In some embodiments, portions of the avatar, such as the hands and/or head, may be directly mapped to their physical counterparts on the individual to whom the avatar corresponds, such that as the individual moves a mapped body part, the avatar executes the same motion with the matching virtual body part. The mixed-reality program 107 may comprise, be integrated with, or otherwise be configured to interoperate with mixed-reality keybinding program 108.

According to the present embodiment, the mixed-reality keybinding program 108 may be a program enabled to visually identify a peripheral and a user interaction with the peripheral, change keybindings for the peripheral, and graphically represent to the user both the peripheral and the user interaction with the peripheral. The mixed-reality keybinding program 108 may, when executed, cause the computing environment 100 to carry out a mixed-reality keybinding process 200. The mixed-reality keybinding process 200 may be explained in further detail below with respect to FIG. 2. In embodiments of the invention, the mixed-reality keybinding program 108 may be stored and/or run within or by any number or combination of devices including computer 101, end user device 103, remote server 104, private cloud 106, and/or public cloud 105, peripheral device set 114, and server 112 and/or on any other device connected to WAN 102. Furthermore, mixed-reality keybinding program 108 may be distributed in its operation over any number or combination of the aforementioned devices.

Figure 2:
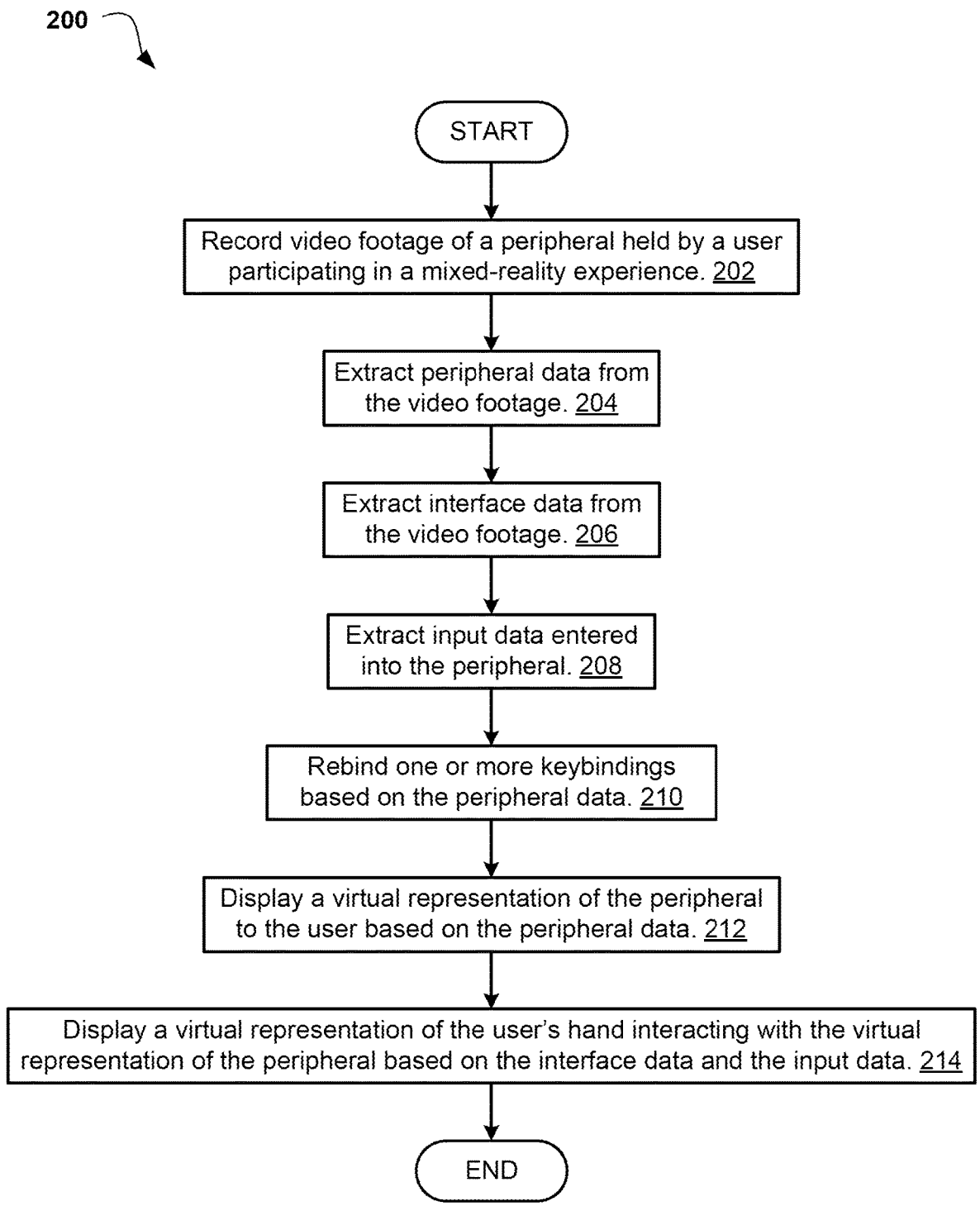
FIG. 2 is an operational flowchart illustrating a mixed-reality keybinding process according to at least one embodiment.

Referring now to FIG. 2, an operational flowchart illustrating a mixed-reality keybinding process 200 is depicted according to at least one embodiment. At 202, the mixed-reality keybinding program 108 may record, using a camera, video footage of a peripheral held by a user. Here, the mixed-reality keybinding program 108 may operate a camera, which may be integrated into a mixed reality device held or on the person of a user, such as a headset or mobile phone, or may be disposed within the environment of the user such that the user is visible to the camera. In some embodiments, the mixed-reality keybinding program 108 may merely receive a camera feed from a camera or another remote source such as a software program, service, database, et cetera. The video feed may be received live as it is being recorded and may reflect events occurring in real time or near-real-time.

At 204, the mixed-reality keybinding program 108 may extract peripheral data from the video footage. Peripheral data may be all data pertaining to the shape, structure, input means, et cetera of the peripheral. Here, the mixed-reality keybinding program 108 may use image processing techniques to identify the peripheral within the video footage and extract a shape of the peripheral and/or one or more input means disposed on the surface of the peripheral, such as buttons, analog sticks, triggers, et cetera. The mixed-reality keybinding program 108 may build a virtual model of the peripheral based on the extracted peripheral data. In some embodiments, the mixed-reality keybinding program 108 may look up the peripheral in a database of various peripherals based on the peripheral data extracted from the video footage; if the mixed-reality keybinding program 108 identifies a match between the virtual model of the peripheral and a peripheral in the database, the mixed-reality keybinding program 108 may retrieve any corresponding information, such as the manufacturer, statistics, input means, performance data, and any other data describing or relevant to the peripheral and add it to the extracted peripheral data. In some embodiments, the mixed-reality keybinding program 108 may interface with the peripheral itself through WAN, LAN, WIFI, Bluetooth, or any other transmission medium, and extract information regarding the manufacturer, serial number, name, type, et cetera pertaining to the peripheral and may add such data to the peripheral data.

At 206, the mixed-reality keybinding program 108 may extract interface data from the video footage. Here, mixed-reality keybinding program 108 may use image processing techniques to track and analyze the movements of the user and the user's hands and arms while holding or otherwise interacting with the peripheral within the video footage. The mixed-reality keybinding program 108 may extract and store the user's actions and movements as animations, or in any other format, such that mixed-reality keybinding program 108 may later adapt such animations and movements for performance by an avatar or visual representation of a hand or the user's hand in particular. In some embodiments of the invention, extracting interface data may occur concurrently with the step of extracting input data, and/or mixed-reality keybinding program 108 may record and/or save interface data from one or more segments of the video footage comprising a segment centered on a point in time when mixed-reality keybinding program 108 has detected that the user is providing an input to the peripheral.

At 208, the mixed-reality keybinding program 108 may extract input data entered into the peripheral. Input data may comprise data pertaining to inputs and actions entered into the peripheral by the user, such as button presses, analogue stick movements, touch sensor data, gesture data, voice data, et cetera. In some embodiments, the mixed-reality keybinding program 108 may interface with the peripheral itself through WAN, LAN, WIFI, Bluetooth, or any other transmission medium, and monitor inputs as they are entered into the peripheral. In some embodiments of the invention, for example where the peripheral is wireless, the mixed-reality keybinding program 108 may monitor wireless network traffic to identify network packets pertaining to inputs from the peripheral, and thereby determine what inputs are being provided to the peripheral. In some embodiments, the mixed-reality keybinding program 108 may interface with the mixed-reality program 107 to receive inputs as they are communicated to the mixed-reality program 107 by the peripheral. In some embodiments, for example where the mixed-reality program 107 displays a representation of the peripheral to the user in the mixed reality environment, along with inputs as they are made in real time, the mixed-reality keybinding program 108 may monitor the mixed-reality environment to visually observe and extract the inputs from the visual representation of the peripheral.

At 210, the mixed-reality keybinding program 108 may rebind one or more keybindings based on the peripheral data. Here, the mixed-reality keybinding program 108 may analyze the peripheral data and one or more keybindings of the mixed-reality program 107 to determine whether the keybindings match the peripheral; for example, by comparing the keys of the keybindings (mouse 1, spacebar, function key 4, et cetera) against the observed type and input means of the peripheral; if the peripheral does not comprise one or more keys that are listed in the keybinding, the mixed-reality keybinding program 108 may remap the keybindings. In another embodiment of the invention, mixed-reality keybinding program 108 may compare an identified peripheral against a pre-provided database of default peripherals associated with the mixed-reality device; in other words, peripherals that are shipped with or sold alongside the mixed-reality device. This pre-provided database may comprise input means and/or visual properties of the default peripherals; the mixed-reality keybinding program 108 may compare the visual data associated with the peripheral extracted from the video feed against the visual properties from the pre-provided list, and if the two do not match, the mixed-reality keybinding program 108 may remap the keybindings. The mixed-reality keybinding program 108 may remap the keybindings by sending a request, interfacing with and/or directly making changes in mixed-reality program 107 through an API to alter the keybindings to match the peripheral based on the peripheral data, for example by mapping inputs to input means observed on the peripheral in the video footage.

At 212, the mixed-reality keybinding program 108 may display a virtual representation of the peripheral to the user based on the peripheral data. Here, the mixed-reality keybinding program 108 may operate a display or request that mixed-reality program 107 operate a display to render a virtual representation of the peripheral; the virtual representation of the peripheral may comprise the virtual model created based on the peripheral data, and may comprise the observed or identified input means comprising the peripheral. In some embodiments, the rendered virtual representation of the peripheral may, based on the input data, reflect user inputs at the associated input means in real time. In one exemplary embodiment, the mixed-reality keybinding program 108 may, responsive to determining that the user has navigated to a keybinding reference screen, which may be a screen in the menus comprising a user interface associated with the mixed-reality environment where keybindings may be shown and modified by the user, render the visual representation of the peripheral for the duration of time that the user has the keybinding reference screen open. In some embodiments of the invention, for example where a virtual representation of a default peripheral is displayed to the user but mixed-reality keybinding program 108 determines that the default peripheral does not match the peripheral, the mixed-reality keybinding program 108 may modify the pre-existing virtual representation of the default peripheral to reflect the visual appearance and disposition, number and type of input means comprising the peripheral. The virtual representation of the avatar or hand may interact with the virtual representation of the peripheral to illustrate input actions performed by the user in real time based on the input data, and/or may perform actions based on a user selecting or mousing over a particular action, to illustrate the corresponding input.

At 214, the mixed-reality keybinding program 108 may display a virtual representation of the user's hand interacting with the virtual representation of the peripheral based on the interface data and the input data. For example, where the mixed-reality keybinding program 108 displays a virtual representation of the peripheral to the user, the mixed-reality keybinding program 108 may utilize the extracted user movements and animations comprising the interface data to animate a virtual avatar, virtual representation of a hand, et cetera in order to illustrate how an individual may interact with the peripheral to perform a particular action in the mixed-reality environment. In some embodiments of the invention, the mixed-reality keybinding program 108 may modify a pre-existing visual representation of a peripheral or display an updated virtual representation of the peripheral next to the pre-existing visual representation based on the peripheral data.

It may be appreciated that FIG. 2 provides only an illustration of one implementation and does not imply any limitations with regard to how different embodiments may be implemented. Many modifications to the depicted environments may be made based on design and implementation requirements.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor implemented method for mixed-reality peripheral interfacing, the method comprising:
recording, with a camera, video footage of a peripheral held by a user participating in a mixed-reality environment;
extracting, by a processor, peripheral data from the video footage;
responsive to determining that the peripheral does not match a default peripheral, modifying a pre-existing virtual representation of the peripheral to reflect a visual appearance and input means comprising the peripheral; and
responsive to determining that one or more keybindings do not match the peripheral, rebinding the one or more keybindings of the peripheral based on the peripheral data.

2. The method of claim 1, further comprising:
displaying a virtual representation of the peripheral to the user within the mixed-reality environment based on the peripheral data.

3. The method of claim 2, further comprising:
extracting input data entered into the peripheral by the user; and wherein the virtual representation visually represents user inputs in real time based on the input data.

4. The method of claim 2, wherein the displaying comprises modifying a pre-existing visual representation of the peripheral based on the peripheral data.

5. The method of claim 1, further comprising:
extracting interface data from the video footage;
extracting input data entered into the peripheral by the user; and
displaying a virtual representation of the user interacting with the virtual representation of the peripheral within the mixed-reality environment based on the interface data and the input data.

6. The method of claim 1, further comprising:
responsive to determining that the user has navigated to a keybinding reference screen, rendering a visual representation of the peripheral for a duration of time that the user remains on the keybinding reference screen based on the peripheral data.

7. A computer system for mixed-reality peripheral interfacing, the computer system comprising:
   one or more processors, one or more computer readable memories and one or more computer readable storage media;
   program instructions, stored on at least one of the one or more storage media for execution by at least one of the one or more processors via at least one of the one or more memories, the program instructions executable to:
      record, with a camera, video footage of a peripheral held by a user participating in a mixed-reality environment;
      extract, by a processor, peripheral data from the video footage; and
      responsive to determining that the peripheral does not match a default peripheral, modify a pre-existing virtual representation of the peripheral to reflect a visual appearance and input means comprising the peripheral; and
   responsive to determining that one or more keybindings do not match the peripheral, rebind the one or more keybindings of the peripheral based on the peripheral data.

8. The computer system of claim 7, further comprising:
   program instructions to display a virtual representation of the peripheral to the user within the mixed-reality environment based on the peripheral data.

9. The computer system of claim 8, further comprising:
   program instructions to extract input data entered into the peripheral by the user; and wherein the virtual representation visually represents user inputs in real time based on the input data.

10. The computer system of claim 8, wherein the program instruction to display comprises modifying a pre-existing visual representation of the peripheral based on the peripheral data.

11. The computer system of claim 7, further comprising:
    program instructions to extract interface data from the video footage;
    program instructions to extract input data entered into the peripheral by the user; and
    program instructions to display a virtual representation of the user interacting with the virtual representation of the peripheral within the mixed-reality environment based on the interface data and the input data.

12. The computer system of claim 7, further comprising:
    program instructions to, responsive to determining that the user has navigated to a keybinding reference screen, render a visual representation of the peripheral for a duration of time that the user remains on the keybinding reference screen based on the peripheral data.

13. A computer program product for mixed-reality peripheral interfacing, the computer program product comprising:
    one or more computer readable storage media;
    program instructions, stored on at least one of the one or more storage media, the program instructions executable by one or more processors, the program instructions executable to:
       record, with a camera, video footage of a peripheral held by a user participating in a mixed-reality environment;
       extract, by a processor, peripheral data from the video footage;
       responsive to determining that the peripheral does not match a default peripheral, modify a pre-existing virtual representation of the peripheral to reflect a visual appearance and input means comprising the peripheral; and
       responsive to determining that one or more keybindings do not match the peripheral, rebind the one or more keybindings of the peripheral based on the peripheral data.

14. The computer program product of claim 13, further comprising:
    program instructions to display a virtual representation of the peripheral to the user within the mixed-reality environment based on the peripheral data.

15. The computer program product of claim 14, further comprising:
    program instructions to extract input data entered into the peripheral by the user; and wherein the virtual representation visually represents user inputs in real time based on the input data.

16. The computer program product of claim 14, wherein the program instruction to display comprises modifying a pre-existing visual representation of the peripheral based on the peripheral data.

17. The computer program product of claim 13, further comprising:
    program instructions to extract interface data from the video footage;
    program instructions to extract input data entered into the peripheral by the user; and
    program instructions to display a virtual representation of the user interacting with the virtual representation of the peripheral within the mixed-reality environment based on the interface data and the input data.

* * * * *